United States Patent
Lin et al.

(10) Patent No.: US 7,399,654 B2
(45) Date of Patent: Jul. 15, 2008

(54) METHOD FOR FABRICATING OPTICAL SENSITIVE LAYER OF SOLAR CELL HAVING SILICON QUANTUM DOTS

(75) Inventors: Ming-Chang Lin, Atlanta, GA (US); Tsun-Neng Yang, Taipei (TW); Shan-Ming Lan, Daxi Town (TW); Tsong-Yang Wei, Taipei (TW); Jyh-Perng Chiu, Dongshan Shiang (TW); Wei-Yang Ma, Banqiao (TW)

(73) Assignee: Atomic Energy Council - Institute of Nuclear Energy Research, Taoyuan (TW)

( * ) Notice: Subject to any disclaimer, the term of this patent is extended or adjusted under 35 U.S.C. 154(b) by 310 days.

(21) Appl. No.: 11/367,371

(22) Filed: Mar. 6, 2006

(65) Prior Publication Data

US 2007/0207563 A1 Sep. 6, 2007

(51) Int. Cl.
*H01L 21/00* (2006.01)
(52) U.S. Cl. .......................................... 438/57; 136/243
(58) Field of Classification Search .................. 438/57; 136/243
See application file for complete search history.

(56) References Cited

U.S. PATENT DOCUMENTS 6,819,845 B2 * 11/2004 Lee et al. ..................... 385/122
2005/0082554 A1 * 4/2005 Torvik ........................ 257/85

* cited by examiner

*Primary Examiner*—Thao X. Le
*Assistant Examiner*—Eric W Jones
(74) *Attorney, Agent, or Firm*—Troxell Law Office, PLLC

(57) ABSTRACT

A distribution layer of silicon quantum dots are fabricated. After the layer is exposed to sun light for a while, the layer absorbs energy and produces pairs of electron and hole. By limiting the movement of the electrons and their moving directions through the structure obtained, the efficiency of an optoelectronic conversion is enhanced.

12 Claims, 5 Drawing Sheets

METHOD FOR FABRICATING OPTICAL SENSITIVE LAYER OF SOLAR CELL HAVING SILICON QUANTUM DOTS

FIELD OF THE INVENTION

The present invention relates to fabricating a layer having silicon quantum dots; more particularly, relates to confining the moving and the moving direction of electrons by a structure having silicon quantum dots to enhance optoelectronic conversion efficiency.

DESCRIPTION OF THE RELATED ART(S)

A general solar cell of semiconductor uses an optical sensitive material of column III element, column V element, silicon bulk or silicon film. Although a sensitivity is achieved, the production is complex and is expansive.

Hence, a solar cell of semiconductor using an organic dye is revealed, where an optoelectronic conversion layer comprises a layer with an optical sensitive dye and an electrolyte. The layer with an optical sensitive dye is set at a layer of positive electrode and the electrolyte is filled between the layer having an optical sensitive dye and the layer of negative electrode.

The prior art simplifies the production a little and somewhat reduces the cost. Nevertheless, the organic dye is made of a polymer; after being exposed under sun light for a period of time, a qualitative change may happen to the material and make it lose its sensitivity. Hence, the prior art does not fulfill users' requests on actual use.

SUMMARY OF THE INVENTION

The main purpose of the present invention is to obtain pairs of electron and hole after absorbing sun light with a distribution layer of silicon quantum dots thinner than 100 nanometers and so to enhance optoelectronic conversion efficiency through confining the moving and the moving direction of electrons by the structure having silicon (Si) quantum dots.

To achieve the above purpose, the present invention is a method for fabricating an optical sensitive layer of a solar cell having silicon quantum dots, where a substrate stacked with a layer of indium tin oxide (ITO) and a layer of titanium oxide ($TiO_2$) is placed into a reaction chamber; by using silane as a precursor and using a dilution gas of argon or as a carrier gas, a nucleation layer of Si quantum dots, a growth layer of Si quantum dots and a passivation layer of Si quantum dots are formed on the $TiO_2$ layer of the substrate through a vapor deposition and multi-pulses to directly grow a structure having distributed plural Si quantum dots; and a film of SiCx quantum dots is deposed outside of the structure having distributed plural Si quantum dots through single pulses to form a distribution layer of Si quantum dots with a thickness thinner than 100 nanometers.

BRIEF DESCRIPTIONS OF THE DRAWINGS

The present invention will be better understood from the following detailed description of the preferred embodiment according to the present invention, taken in conjunction with the accompanying drawings, in which FIG. 1 is a sectional view showing a substrate used in a preferred embodiment according to the present invention;

DESCRIPTION OF THE PREFERRED EMBODIMENT

The following description of the preferred embodiment is provided to understand the features and the structures of the present invention.

Figure 1:
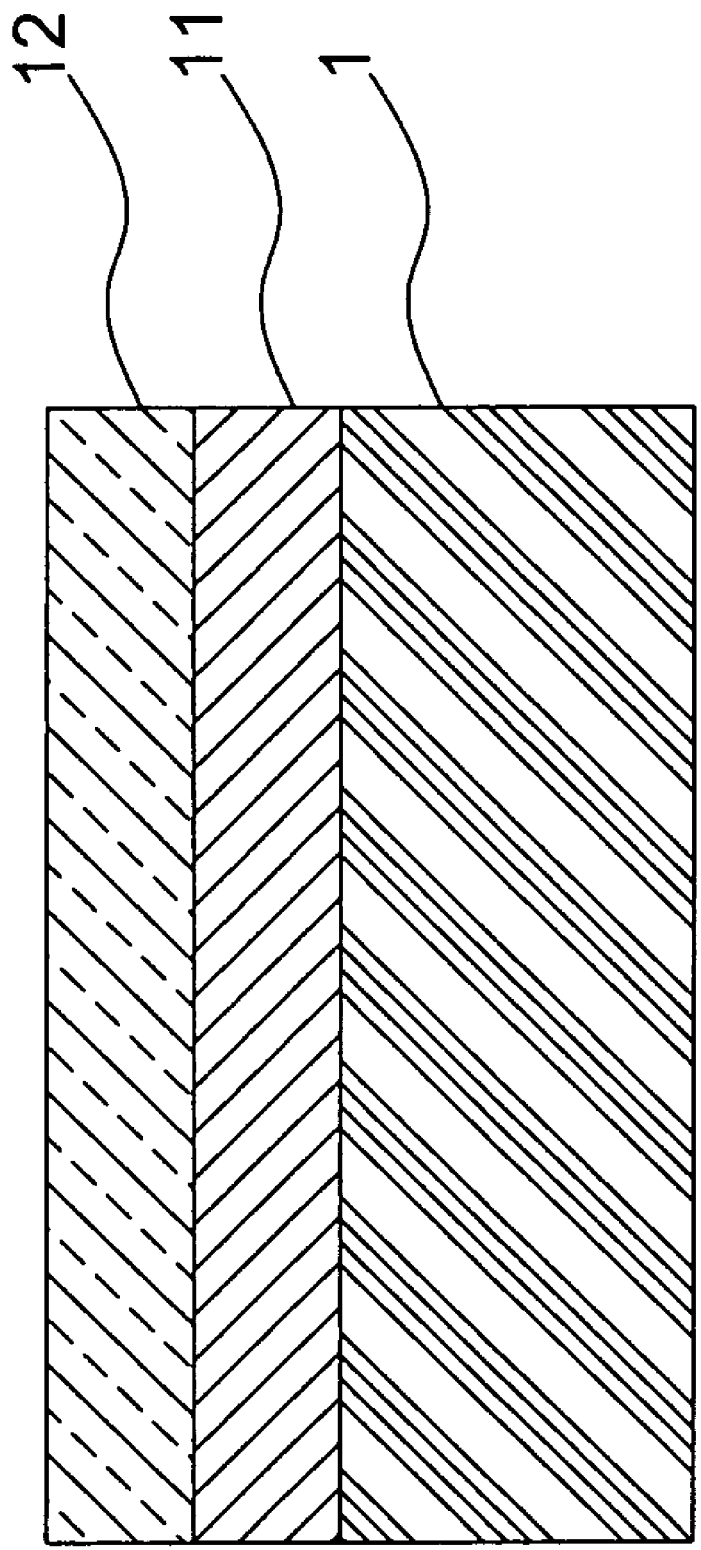
Figure 2:
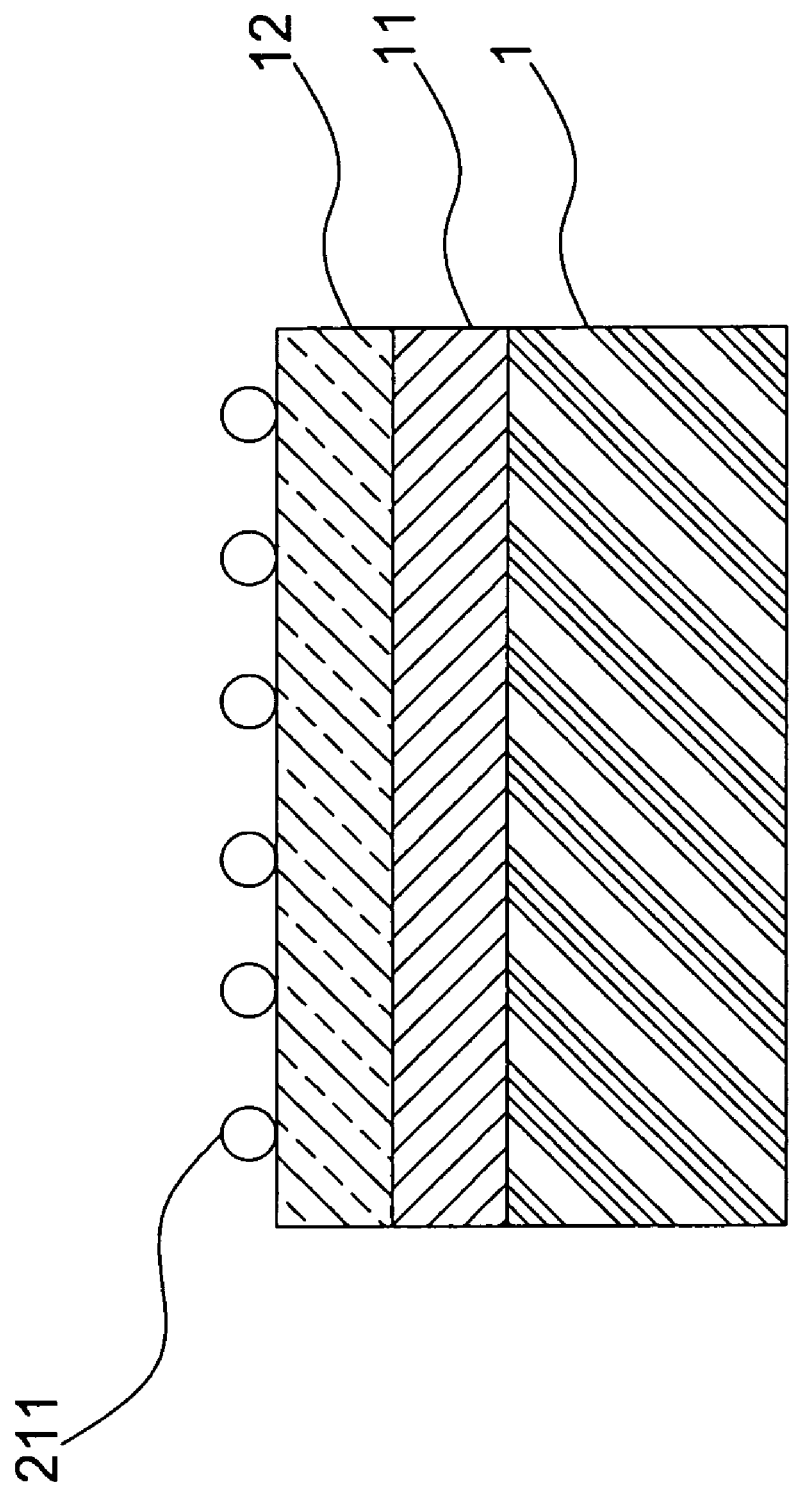
FIG. 2 is a view showing a nucleation layer of Si quantum dots in step (c)
Figure 3:
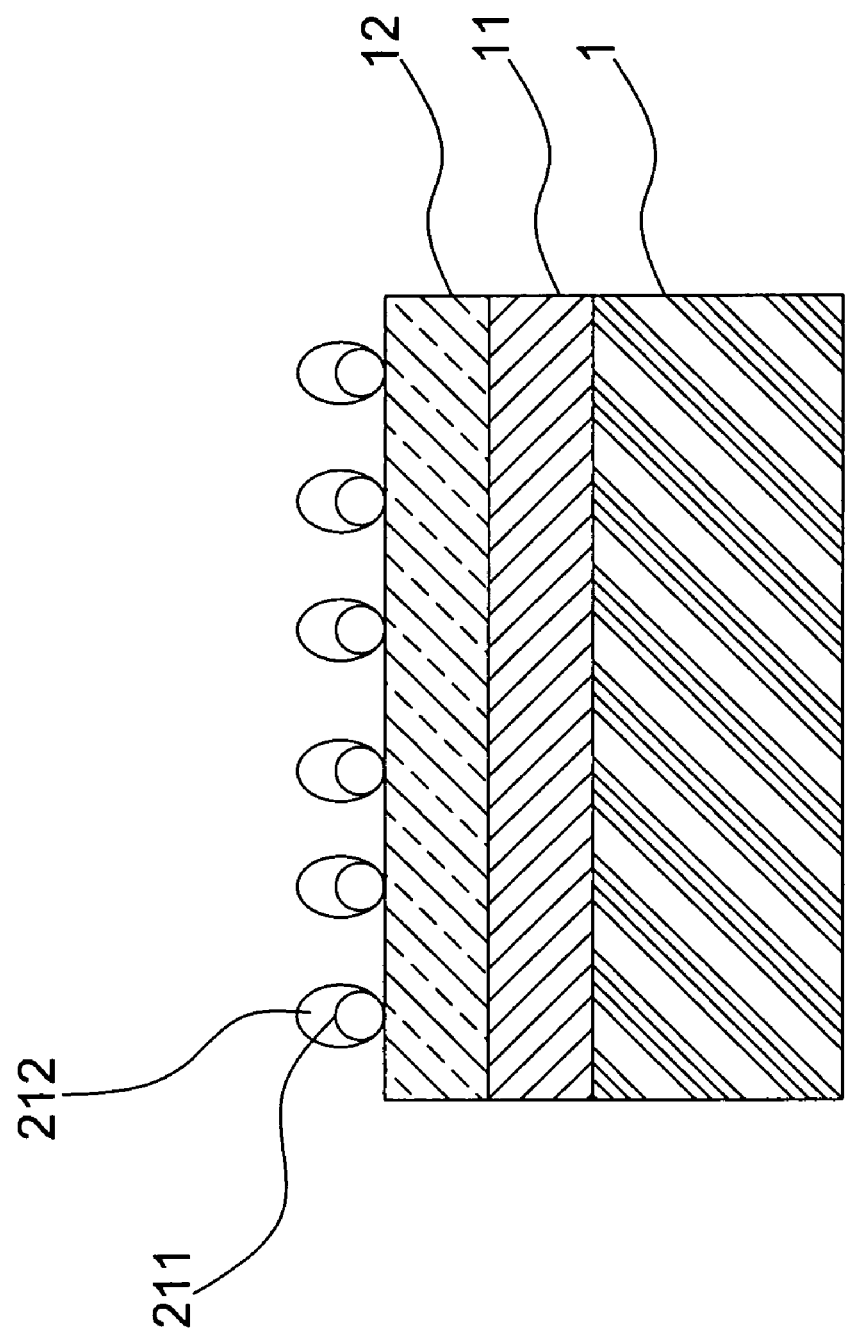
FIG. 3 is a view showing a growth layer.
Figure 4:
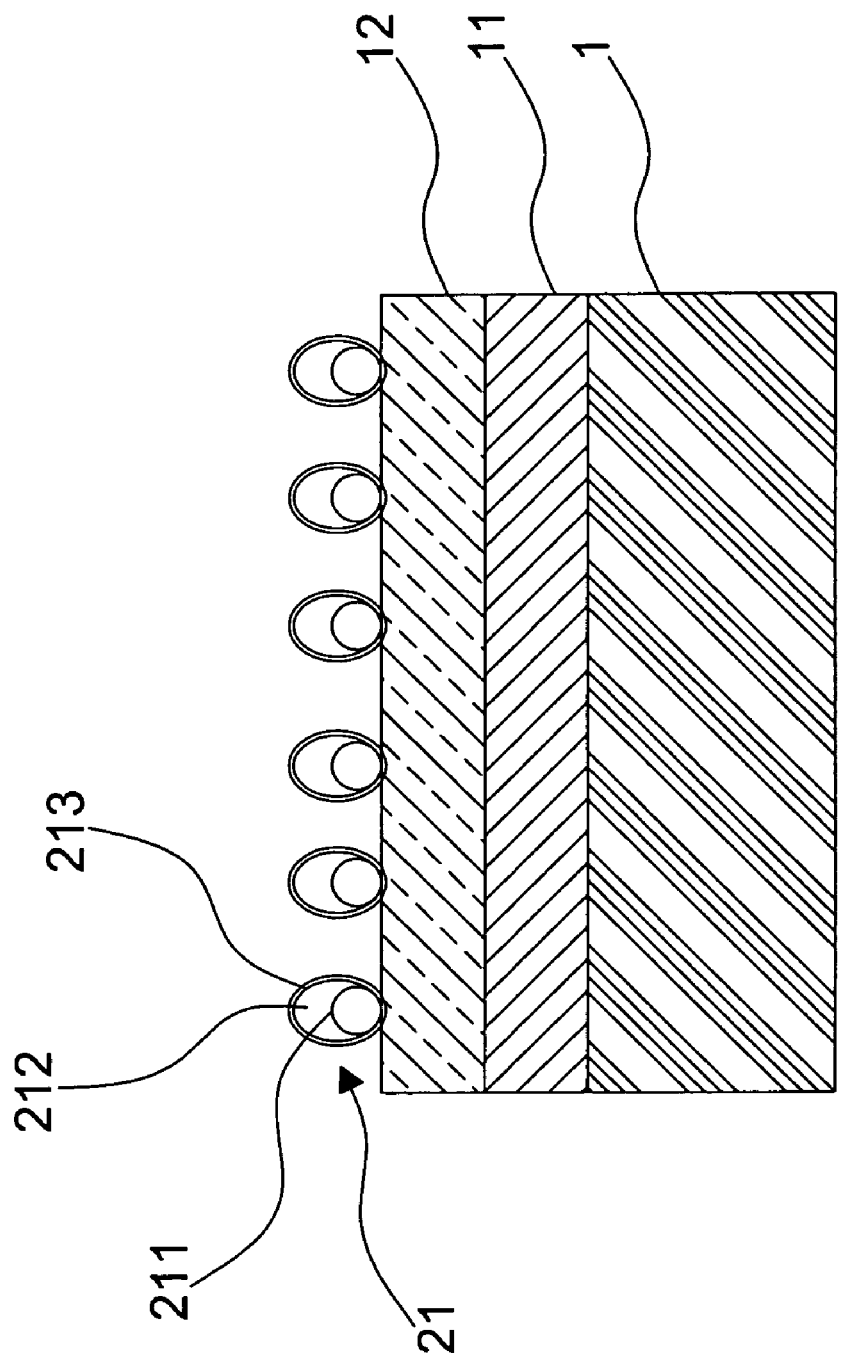
FIG. 4 is a view showing a passivation layer.
Figure 5:
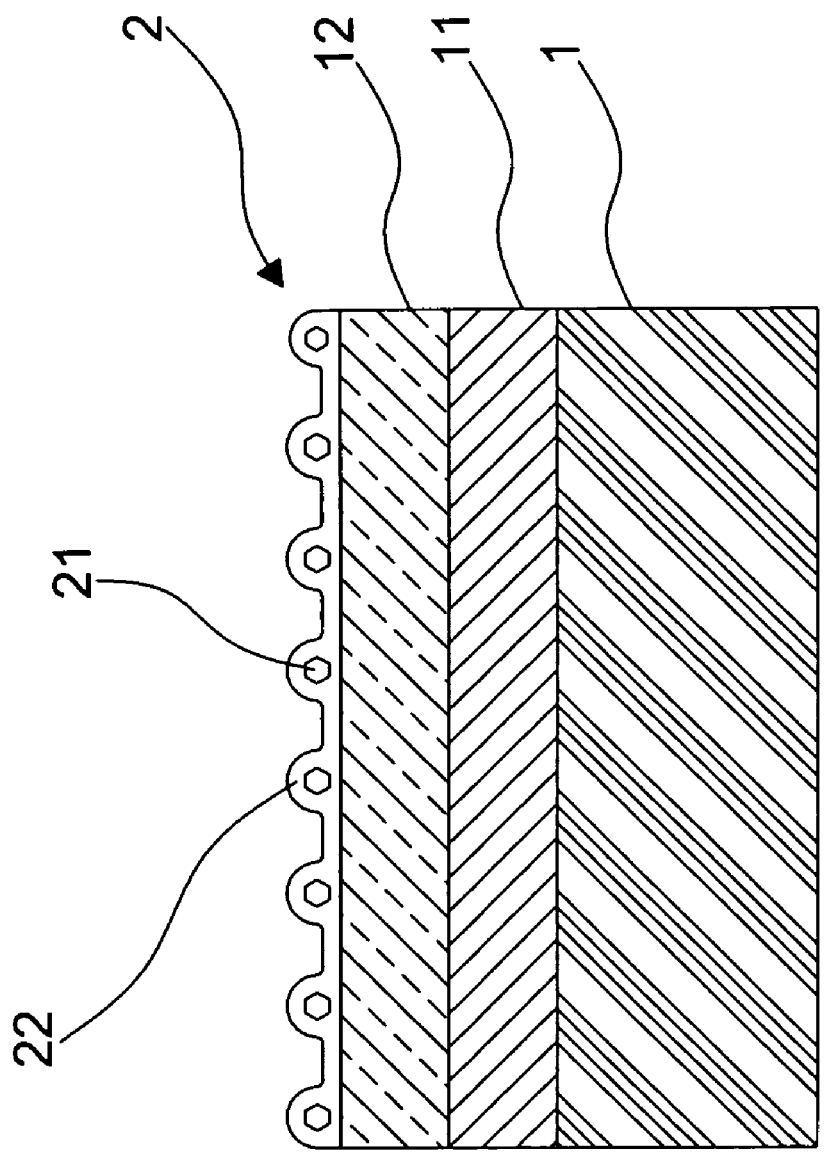
FIG. 5 is a view showing a distribution layer of Si quantum dots in step (d).

Please refer to FIG. 1 till FIG. 5, which are a sectional view showing a substrate, views showing a nucleation layer, a growth layer and a passivation layer of silicon (Si) quantum dots in step (c), and a view showing a distribution layer of Si quantum dots in step (d), according to a preferred embodiment of the present invention. As shown in the figures, the present invention is a method for fabricating an optical sensitive layer of a solar cell having Si quantum dots, comprising the following steps:

(a) A substrate 1 stacked with at least a layer of indium tin oxide (ITO) 11 and a layer of titanium oxide ($TiO_2$) 12 is obtained, where the substrate 1 is made of a conductive glass or a plastic material.

(b) The substrate 1 is put into a reaction chamber.

(c) By using a precursor of silane (SiH4) and using a dilution gas of argon or as a carrier gas in the reaction chamber, a nucleation layer 211 of silicon (Si) quantum dots, a growth layer 212 of Si quantum dots and a passivation layer 213 of Si quantum dots are formed through a plasma-enhanced chemical vapor deposition (PECVD) and multi-pulses on the $TiO_2$ layer 12 of the substrate 1 to directly grow a structure 21 having distributed plural Si quantum dots, where the reaction chamber has a density ratio or a flow ratio between 1% and 20%; a working gas pressure between 1 milli-Torr (mTorr) and 2000 m Torr; and a working temperature for the substrate 1 between a room temperature and a temperature of 350 Celsius degrees.

(d) And, then, a film of $SiC_x$ quantum dots 22 is deposed outside of the structure having distributed plural Si quantum dots 21 through single pulses to form a distribution layer of Si quantum dots 2 with a thickness thinner than 100 nanometers.

Thus, with the above steps, a novel method for fabricating an optical sensitive layer of a solar cell having silicon quantum dots is obtained.

Therein, in step (c), dangling bonds of Si—H and Si—C on surfaces of Si atoms are obtained during the forming of the passivation layer of Si quantum dots, where the forming of the passivation layer uses a gas producing hydrogen atoms or carbon atoms; and the gas is a hydrogen gas ($H_2$) or a methane gas ($CH_4$). Consequently, the Si quantum dots are prevented from oxidation, chemical reaction or physical friction and obtain an enhanced optical current and an optical voltage.

After being exposed under sun light, the structure of a distribution layer of Si quantum dots formed according to the present invention obtains an optical current between 1 $mA/cm^2$ (milli-ampere per square centimeter) and 1 $A/cm^2$ (ampere per square centimeter); an optical voltage between 0.1 volt (V) and 1.0V (or above 1.0V); and an optoelectronic conversion efficiency of a ratio between 1 percent (%) and 60%.

To sum up, the present invention is a method for fabricating an optical sensitive layer of a solar cell having silicon quantum dots, where a distribution layer of Si quantum dots with a thickness thinner than 100 nm is fabricated; after absorbing sun light with the distribution layer, pairs of electron and hole are obtained; and, as the moving and the moving direction of the electrons are confined by the structure having Si quantum dots, the optoelectronic conversion efficiency is enhanced.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method for fabricating an optical sensitive layer of a solar cell having silicon quantum dots, comprising steps of:
   (a) obtaining a substrate stacked with at least a layer of indium tin oxide (ITO) and a layer of titanium oxide ($TiO_2$);
   (b) placing said substrate in a reaction chamber;
   (c) by using a precursor of silane (SiH4) and using a dilution gas of argon in said reaction chamber, forming a nucleation layer of silicon (Si) quantum dots, a growth layer of Si quantum dots and a passivation layer of Si quantum dots on said $TiO_2$ layer of said substrate through a vapor deposition and multi-pulses to directly grow a structure having distributed plural Si quantum dots; and
   (d) through single pulses, directly depositing a film having $SiC_x$ quantum dots outside of said structure having distributed plural Si quantum dots to obtain a distribution layer of Si quantum dots on a surface of said layer of $TiO_2$.

2. The method according to claim 1, wherein a carrier gas of argon is used in step (c) instead of said dilution gas of argon.

3. The method according to claim 1, wherein said substrate is made of a conductive glass.

4. The method according to claim 1, wherein said substrate is made of a plastic material.

5. The method according to claim 1 wherein said silane in said reaction chamber has a density ratio between 1 percent (%) and 20%.

6. The method according to claim 1, wherein said silane in said reaction chamber has a flow ratio between 1% and 20%.

7. The method according to claim 1, wherein a working gas pressure in said reaction chamber is located between 1 millitorr (mTorr) and 2000 mTorr.

8. The method according to claim 1, wherein said substrate in said reaction chamber has a working temperature between a room temperature and a temperature of 350 Celsius degrees.

9. The method according to claim 1, wherein said vapor deposition is a plasma-enhanced chemical vapor deposition (PECVD).

10. The method according to claim 1, wherein dangling bonds of Si—H and Si—C are obtained on surfaces of Si atoms through said forming of said passivation layer of Si quantum dots.

11. The method according to claim 1, wherein a gas providing atoms is used during said forming of said passivation layer of Si quantum dots; wherein said atoms are selected from a group consisting of hydrogen atoms and carbon atoms; and wherein said gas is selected from a group consisting of a hydrogen gas ($H_2$) and a methane gas ($CH_4$).

12. The method according to claim 1, wherein a thickness of said distribution layer of Si quantum dots is thinner than 100 nanometers.

* * * * *